US008018535B2

(12) United States Patent  
Nam et al.

(10) Patent No.: US 8,018,535 B2
(45) Date of Patent: Sep. 13, 2011

(54) ELECTRONIC IMAGING DEVICE AND DRIVING METHOD THEREFOR

(75) Inventors: Hui Nam, Yongin-si (KR); Beom-Shik Kim, Yongin-si (KR); Chan-Young Park, Yongin-si (KR); Ja-Seung Ku, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 619 days.

(21) Appl. No.: 11/931,362

(22) Filed: Oct. 31, 2007

(65) Prior Publication Data

US 2008/0211976 A1    Sep. 4, 2008

(30) Foreign Application Priority Data

Mar. 2, 2007 (KR) .................. 10-2007-0021137

(51) Int. Cl.
   *G02F 1/1335* (2006.01)
   *G02F 1/1347* (2006.01)
   *G02F 1/1343* (2006.01)
   *G02B 27/22* (2006.01)
(52) U.S. Cl. ............. 349/15; 349/77; 349/141; 359/464
(58) Field of Classification Search ............ 349/15, 349/77, 141; 359/464
   See application file for complete search history.

(56) References Cited

U.S. PATENT DOCUMENTS

| 6,859,240 B1 * | 2/2005 | Brown et al. | 349/15 |
| 2006/0146208 A1 * | 7/2006 | Kim | 349/15 |

FOREIGN PATENT DOCUMENTS

| KR | 2003-0046748 | 6/2003 |
| KR | 2003-0088244 | 11/2003 |
| KR | 10-2005-0086222 | 8/2005 |
| KR | 10-2006-0097175 | 9/2006 |

OTHER PUBLICATIONS

Korean Patent Abstracts, Publication No. 1020030046748 A; Date of Publication: Jun. 18, 2003; in the name of In Ho Shin.
Korean Patent Abstracts, Publication No. 1020030088244 A; Date of Publication: Nov. 19, 2003; in the name of Hyeong Uk Jang, et al.
Korean Patent Abstracts, Publication No. 1020050086222 A; Date of Publication: Aug. 30, 2005; in the name of Hyoung Wook Jang, et al.
Korean Patent Abstracts, Publication No. 1020060097175 A; Date of Publication: Sep. 14, 2006; in the name of Hui Nam, et al.

* cited by examiner

*Primary Examiner* — Michael H Caley
(74) *Attorney, Agent, or Firm* — Christie, Parker & Hale, LLP

(57) ABSTRACT

An electronic imaging device includes a display unit and a barrier layer. The display unit includes scan lines for transferring select signals, data lines for transferring data signals corresponding to first and second images formed according to one or more input signals, and pixels connected with the scan and data lines. The barrier layer includes first barriers and second barriers corresponding to the first barriers. The first image is displayed during a first period of a unit period during which an image of a single frame is displayed. The second image is displayed during a second period different from the first period. The first barriers are driven according to the first image, the second barriers are driven according to the second image, and a region of the barrier layer corresponding to a mixed region in which the first and second images coexist is a non-transmission region.

13 Claims, 9 Drawing Sheets

ELECTRONIC IMAGING DEVICE AND DRIVING METHOD THEREFOR

CROSS-REFERENCE TO RELATED APPLICATION

This application claims priority to and the benefit of Korean Patent Application No. 10-2007-0021137 filed in the Korean Intellectual Property Office on Mar. 2, 2007, the entire content of which is incorporated herein by reference.

BACKGROUND OF THE INVENTION

1. Field of the Invention

The present invention relates to an electronic imaging device, and more particularly, to an electronic imaging device capable of displaying stereoscopic images.

2. Description of the Related Art

In general, humans perceive a stereoscopic effect based on physiological and experiential factors, and three-dimensional image displaying technologies express a stereoscopic effect of an object by using binocular parallax, which is a key factor for allowing humans to recognize a stereoscopic effect at a short distance.

Typically, an electronic imaging device that displays stereoscopic images use a method in which left and right images are spatially separated by using an optical element so that a stereoscopic image can be seen. Typical methods include a method using a lenticular lens array and a method using a parallax barrier.

When displaying a stereoscopic image, a picture quality of the image may be degraded as compared with displaying a planar (or two-dimensional) image. This degradation may be reduced by using an electronic imaging device for displaying a stereoscopic image that can operate at a higher driving frequency as compared with an electronic imaging device for displaying (or only displaying) a planar (or two-dimensional) image. However, the operation at the higher driving frequency causes an increase in power consumption of the electronic imaging device, and despite the operation at the higher driving frequency, picture quality may still not be satisfactory.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of embodiments of the present invention are directed to an electronic imaging device and/or a driving method therefor for improving picture quality of a stereoscopic image and/or reducing power consumption.

An exemplary embodiment of the present invention provides an electronic imaging device including a display unit and a barrier layer. The display unit includes scan lines for transferring select signals, data lines for transferring data signals corresponding to first and second images formed according to one or more input signals, and pixels connected with the scan and data lines. The barrier layer includes first barriers and second barriers corresponding to the first barriers. The first image is displayed during a first period of a unit period during which an image of a single frame is displayed. The second image is displayed during a second period different from the first period. The first barriers are driven according to the first image, the second barriers are driven according to the second image, and a region of the barrier layer corresponding to a mixed region in which the first and second images coexist is a non-transmission region.

In one embodiment, the first barriers are driven in synchronization with when one of the select signals is transferred to one of a plurality of first scan lines of the plurality of scan lines, the first scan lines corresponding to the first barriers. Here, the first barriers may include a plurality of first electrodes corresponding to each of the plurality of first scan lines and a first connection electrode connected to the plurality of first electrodes.

In one embodiment, the second barriers are driven in synchronization with when one of the select signals is transferred to one of a plurality of first scan lines of the plurality of scan lines, the first scan lines corresponding to the second barriers. Here, the second barriers may include a plurality of first electrodes corresponding to each of the plurality of first scan lines and a first connection electrode connected to the plurality of first scan lines.

In one embodiment, the first barriers are driven in synchronization with when one of the select signals is transferred to one of a plurality of first scan lines of the plurality of scan lines during the first period, the first scan lines corresponding to the first barriers, and the second barriers corresponding to the first barriers are driven in synchronization with when the one of the select signals is transferred to the one of the plurality of first scan lines during the second period. Here, the first barriers may include a plurality of first electrodes corresponding to each of the plurality of first scan lines and a first connection electrode connected to the plurality of first electrodes, and the second barriers may include a plurality of second electrodes corresponding to each of the plurality of first scan lines and positioned parallel to each of the plurality of first electrodes.

In one embodiment, after the second image has been displayed, when a third image of another frame following the single frame is displayed, the two first barriers are driven according to the third image.

In one embodiment, the input signal includes a first view point image corresponding to a first view point and a second view point image corresponding to a second view point, and the first image is generated by combining the first and second view point images in the order of the first view point and the second view point, and the second image is generated by combining the first and second view point images in the order of the second view point and the first view point. Here, the first image may be displayed according to a scan direction in which one of the select signals is transferred to the plurality of scan lines during the first period, the second image may be displayed according to the scan direction during the second period, and the mixed region may be a region in which the first and second images coexist as the second image starts to be displayed according to the scan direction after the first image has been displayed.

In one embodiment, each of the pixels includes an organic light emitting element.

In one embodiment, each of the pixels includes a liquid crystal layer.

Another embodiment of the present invention provides a method for driving an electronic imaging device that displays a stereoscopic image according to an input signal. The method includes combining first and second images according to at least one input signal; sequentially driving a plurality of first barriers during a period during which the first image is displayed; sequentially driving a plurality of second barriers during a period during which the second image is displayed; and rendering one of the plurality of first barriers and one of the plurality of second barriers that correspond to a region in which the first and second images coexist as the second image starts to be displayed after the first image has been displayed to become a non-transmission region.

In one embodiment, the sequentially driving the plurality of first barriers includes transferring a plurality of select signals according to a direction in which the first image is displayed and driving the first barriers in synchronization with one of a plurality of corresponding first select signals of the plurality of select signals.

In one embodiment, the sequentially driving the plurality of second barriers includes transferring a plurality of select signals according to a direction in which the second image is displayed and driving the second barriers in synchronization with one of a plurality of corresponding first select signals of the plurality of select signals.

In one embodiment, in the rendering of the one of the plurality of first barriers and the one of the plurality of second barriers to become the non-transmission region, when the second image starts to be displayed after the first image has been displayed, the one of the first barriers and the one of the second barriers corresponding to a region in which the first and second images coexist is changed to become the non-transmission region.

Another exemplary embodiment of the present invention provides an electronic imaging device including a display unit and a barrier layer. The display unit includes a plurality of scan lines for transferring a plurality of select signals, a plurality of data lines for transferring a plurality of data signals corresponding to a first image and a second image of a single frame, the first and second images being formed according to at least one input signal, and a plurality of pixels connected with the scan lines and the data lines. The barrier layer includes a plurality of first barriers and a plurality of second barriers corresponding to the first barriers. The single frame is time divided into a first period and a second period differing from the first period. The first image is displayed during the first period. The second image is displayed during the second period. The first barriers are driven according to the first image, the second barriers are driven according to the second image, and a region of the barrier layer corresponding to where the first and second images coexist is a non-transmission region.

DETAILED DESCRIPTION OF THE EMBODIMENTS

Figure 1:
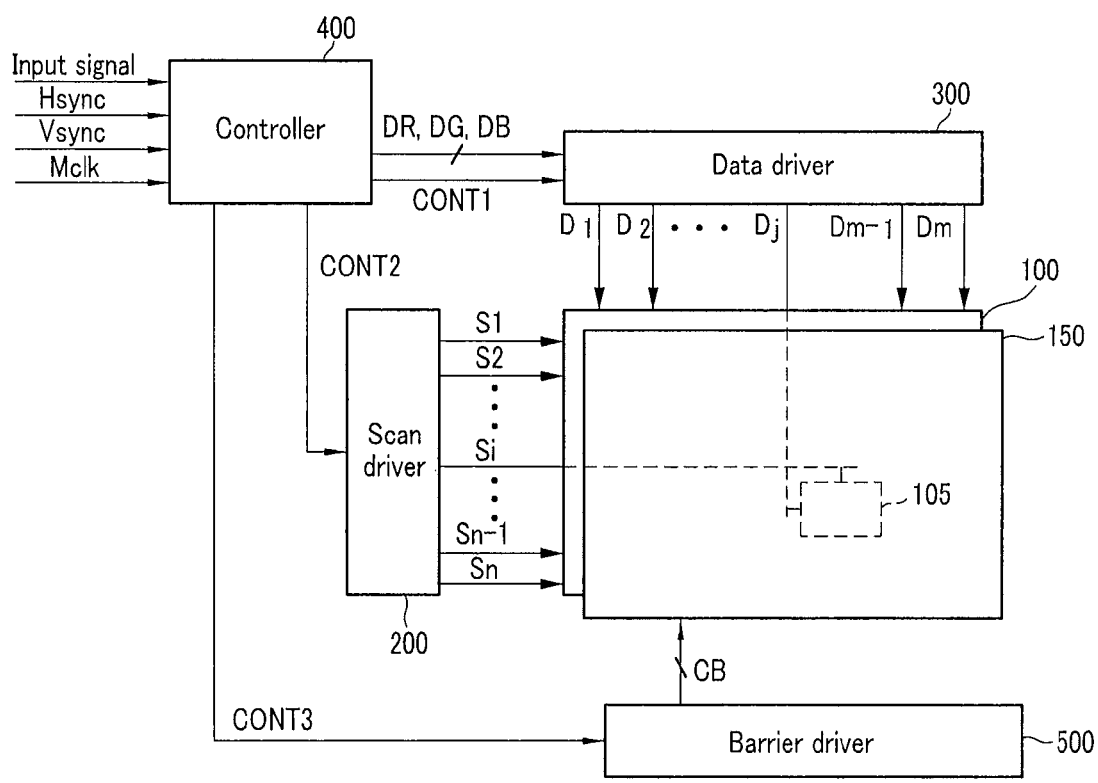
FIG. 1 schematically illustrates an electronic imaging device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that a first element is "coupled" or "connected" to a second element, the first element may be "directly coupled" or "directly connected" to the second element or be "electrically coupled" or "electrically connected" to the second element through one or more other elements. In addition, unless explicitly described to the contrary, the word "comprise", and variations such as "comprises" and "comprising", will be understood to imply the inclusion of stated elements but not the exclusion of any other elements.

The electronic imaging device and its driving method according to exemplary embodiments of the present invention will now be described in more detail below.

FIG. 1 schematically shows an electronic imaging device according to an exemplary embodiment of the present invention.

As shown in FIG. 1, the electronic imaging device according to one embodiment of the present invention is an imaging device that can selectively display a planar image and a stereoscopic image, and includes a display unit (or display region) 100, a barrier layer 150, a scan driver 200, a data driver 300, a controller 400, and a barrier driver 500.

The display unit 100 includes a plurality of scan lines S1~Sn (S1, S2, . . . , Si, . . . , Sn−1, Sn) that transfer select signals, a plurality of data lines D1~Dm (D1, D2, . . . , Dj, . . . , Dm−1, Dm) that are formed to be insulated from and to cross the plurality of scan lines S1~Sn and that transfer data signals, and a plurality of pixels 105 formed at crossings of the scan lines and the data lines. In the present exemplary embodiment, it is assumed that a red sub-pixel that displays red (R) color, a green sub-pixel that displays green (G) color, and a blue sub-pixel that displays blue (B) color form a single pixel. Also, in the present exemplary embodiment, the plurality of pixels 105 of the display unit 100 are divided into pixels corresponding to a left-eye image (hereinafter, also referred to as 'left-eye pixels'), and pixels corresponding to a right-eye image (hereinafter, also referred to as 'right-eye pixels'). The left-eye pixels and the right eye pixels are formed to be alternately and/or repeatedly arranged. In more detail, the left-eye pixels and the right eye-pixels are alternately and/or repeatedly arranged in parallel with each other to have a stripe pattern and/or a zigzag pattern. The left-eye pixels and the right-eye pixels can be suitably changed (or varied) according to a structure of the barrier layer 150.

According to the present exemplary embodiment, pixels 105 of the display unit 100 may include one or more organic light emitting diodes (OLEDs) and one or more pixel circuits required for driving the one or more OLEDs.

Figure 2:
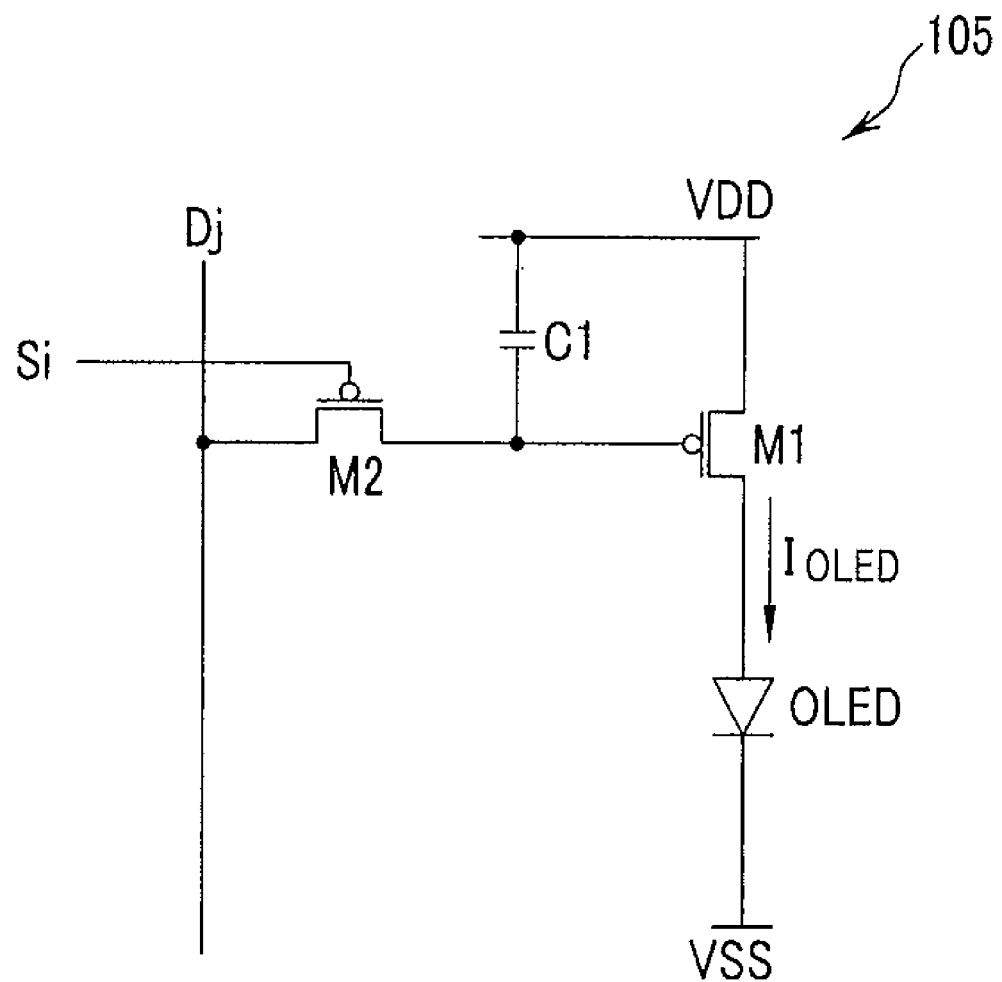
FIG. 2 schematically illustrates a structure of a pixel circuit according to an exemplary embodiment of the present invention.

FIG. 2 schematically illustrates a structure of a pixel circuit of a pixel according to one exemplary embodiment of the present invention.

In one embodiment and referring to FIG. 2, a pixel circuit of a pixel 105 includes a driving transistor M1, a switching transistor M2, a capacitive element (capacitor) C1, and an OLED. The OLED has diode characteristics, and has a structure that includes an anode electrode layer (anode), an organic thin film, and a cathode electrode layer (cathode).

A pixel circuit is arranged (or positioned) at each crossing of one of the plurality of scan lines (Si) and one of the plurality of data lines (Dj), and is connected to the one of the scan lines (Si) and the one of the data lines (Dj). The driving transistor M1 generates a driving current in response to a voltage applied to its gate electrode and its source electrode. The switching transistor M2 is turned on in response to a select signal transferred from the scan line Si, and when the switching transistor M2 is turned on, a data signal transferred from the data line Dj is transferred to the gate electrode of the driving transistor M1. The capacitive element C1 has first and second ends respectively connected to the gate electrode and the source electrode of the driving transistor M1, and uniformly maintains voltages of the first and second ends. The driving transistor M1 generates a driving current IOLED corresponding to a difference between the voltage of the data signal transferred to the gate electrode of the driving transistor M1 and a power source voltage VDD applied to the source electrode of the driving transistor M1. The thusly generated driving current IOLED flows to the OLED through a drain electrode of the driving transistor M1. The OLED emits light corresponding to the driving current IOLED.

The scan driver 200 is connected with the scan lines S1~Sn of the display unit 100 and applies select signals formed of a combination of a gate ON voltage and a gate OFF voltage to the scan lines S1~Sn. The scan driver 200 may apply the select signals to the plurality of scan lines S1~Sn such that the select signals have the gate ON voltage sequentially. When the select signals have the gate ON voltage, a switching transistor of a pixel circuit connected with a corresponding scan line is turned on.

The data driver 300 is connected with the data lines D1~Dm of the display unit 100 and applies data signals each representing a gray level to the data lines D1~Dm. The data driver 300 converts input image data DR, DG, and DB, which are input from the controller 400 and have gray level information, into the data signals in the form of voltage or current.

The controller 400 receives an input signal IS, a horizontal synchronization signal Hsync, and a vertical synchronization signal Vsync from one or more external sources, generates a scan control signal CONT1, a data control signal CONT2, the image data DR, DG, and DB, and a barrier driver control signal CONT3, and transfers them respectively to the data driver 300, the scan driver 200, the data driver 300, and the barrier driver 500. The scan control signal CONT1 includes a scan start signal for indicating the start of scanning and a first clock signal. In the present exemplary embodiment, the scan start signal is a signal that controls a point of time at which an image of a single frame starts to be displayed on the display unit in synchronization with the vertical synchronization signal for indicating the start of transferring of image data of the single frame, and the first clock signal is a signal that controls a point of time at which select signals are transferred to each of the plurality of scan lines S1~Sn in synchronization with the horizontal synchronization signal for indicating transferring of the input image data with respect to pixels of a single row. The data signal control CONT2 includes a second clock signal having a certain period in synchronization with the horizontal synchronization signal and a horizontal synchronization start signal that controls the start of the transfer of the data signal, etc. In transferring the input image data corresponding to the pixels of a single row to the data driver 300, the controller 400 may transfer the input image data DR, DG, and DB through three channels by color or may sequentially transfer the input image data DR, DG, and DB through a single channel.

Here, the input signal IS input to the controller 400 may be planar (or two-dimensional data (2D)) image data, three-dimensional (3D) graphic data to be displayed in three dimensions on a planar surface by including three-dimensional spatial coordinates and surface information of an object, and stereoscopic image data including time-point image data, and when a planar image and a stereoscopic image are displayed together on the display unit 100, they may include all the planar image data and stereoscopic image data. When the input signal is stereoscopic image data, the controller 400 transfers the barrier driver control signal CONT3 to the barrier driver 500 in order to control a plurality of barriers constituting the barrier layer 150. The controller generates the barrier driver control signal CONT3 in order to drive the barrier layer 150 according to a select signal transferred to the plurality of scan lines S1~Sn. In more detail, in the present exemplary embodiment, when the barrier layer 150 is divided into a plurality of barriers, the barriers are controlled to be operated in synchronization with a point of time at which a select signal is transferred to one of the plurality of scan lines corresponding to one of the barriers. When the scan driver 200 transfers a select signal to each of the plurality of scan lines according to the first clock signal, the controller 400 detects a scan line to which the select signal is applied among the scan lines corresponding to the plurality of barriers. The controller 400 generates the barrier driver control signal so that the barriers can be operated in synchronization with a point of time when an arbitrary select signal is transferred to the plurality of scan lines corresponding to the plurality of barriers. Then, the barrier driver drives the barriers or stops their operation according to the barrier driver control signal.

The barrier driver 500 generates a plurality of barrier drive signals CB and transfers them to the barrier layer 150 in order to control the plurality of barriers of the barrier layer 150. The barrier driver 500 and the barrier layer 150 will be described in more detail below.

First, a time division driving method according to an present exemplary embodiment will be described with reference to FIG. 3.

Figure 3:
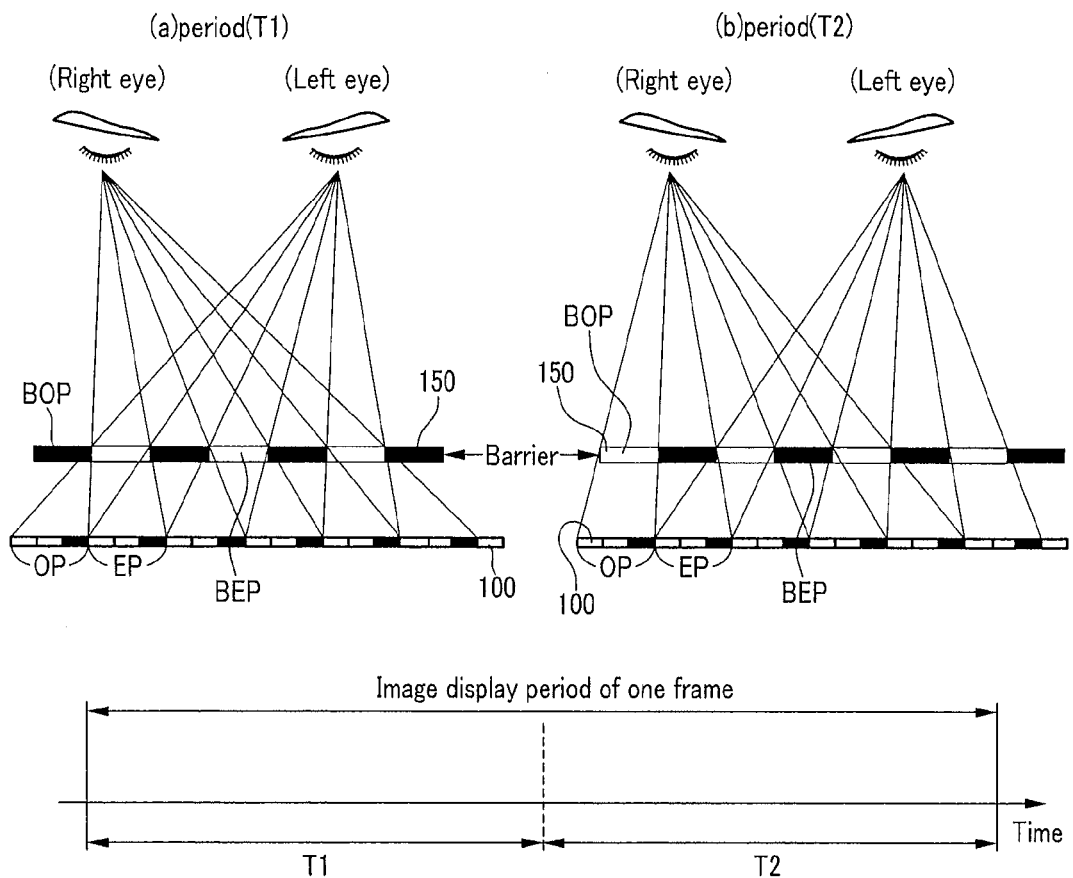
FIG. 3 schematically illustrates a time division driving method of a planar/stereoscopic image display device according to an exemplary embodiment of the present invention.

FIG. 3 schematically illustrates a time division driving method of a planar/stereoscopic image display device according to an exemplary embodiment of the present invention.

The time division driving method may include: 1) a method in which a light source is alternately operated at left and right sides, and the left and right sides are divided according to a time division by using an optical element including a combination of a prism and a lenticular lens; or 2) a method in which a slit, through which light passes, in a liquid crystal barrier is divided into several sections and the divided slit sections are moved in synchronization with a displayed image. The electronic imaging device according to the exemplary embodiment of the present invention is driven according to method 2). However, the present invention is not limited thereto, and when method 1) is used, an optical element including a combination of a light source, the prism, and the lenticular lens, instead of the liquid crystal barrier, can be used. FIG. 3 shows a case of two eyes (e.g., two eyes of one viewer), but the present invention is not limited thereto, and the same (or substantially the same) principle can be applied for a case of multiple viewers with multiple eyes.

First, FIG. 3 shows that an image obtained by combining the left and right sides at a first period T1 is directed or projected to (or seen by a left eye and a right eye of) a user when driving is performed utilizing time division of one frame into the first and second periods T1 and T2. FIG. 3 also shows that an image obtained by combining the right and left sides at the second period T2 is directed or projected to (or seen by the left eye and the right eye of) the user.

In the first period T1, an odd pixel OP of the display unit 100 is a left-eye pixel and an even pixel EP is a right-eye pixel. An odd pixel BOP of the barrier layer 150 is a non-transmission region and an even pixel BEP of the barrier layer 150 is a transmission region. In the first period T1, there are formed a path through which a left-eye image is projected to the left eye and a path through which a right-eye image is projected to the right eye. The left-eye image projected from the odd pixel OP is formed as an image having a certain disparity with respect to the right-eye image, and the right-eye image projected from the even pixel EP is formed as an image having a certain disparity with respect to the left-eye image. Accordingly, when the user recognizes the left-eye image projected from the odd pixel OP and the right-eye image projected from the even pixel EP with his/her left and right eyes, he/she obtains depth information as if he/she were looking at an actual solid target through his/her left and right eyes, thereby perceiving a stereoscopic effect.

In the second period T2, the odd pixel OP of the display unit 100 is the right-eye pixel and the even pixel EP of the display unit 100 is the left-eye pixel. The odd pixel BOP of the barrier layer 150 is a transmission region and the even pixel BEP of the barrier layer 150 is a non-transmission region. In the second period T2, there are formed a path through which a left-eye image is projected to the user's left eye and a path through which a right-eye image is projected to the user's right eye. The right-eye image projected from the odd pixel OP is formed as an image having a certain disparity with respect to the left-eye image, and the left-eye image projected from the even pixel EP is formed as an image having a certain disparity with respect to the right-eye image. Accordingly, when the user recognizes the right-eye image projected from the odd pixel OP and the left-eye image projected from the even pixel EP with his/her left and right eyes, he/she obtains depth information as if he/she were looking at an actual solid target through his/her left and right eyes, thereby perceiving a stereoscopic effect.

In this manner, during the period T1, the odd pixel is seen by a user's left eye while the even pixel is seen by a user's right eye, and during the period T2, the odd pixel is seen by a user's right eye while the even pixel is seen by a user's left eye. Accordingly, the user can watch the stereoscopic image with the same resolution as that of a planar image. However, because an image is displayed according to a scan direction in which the select signals are transferred to the plurality of scan lines S1~Sn, when a right and left image in which right-eye and left-eye images are combined is displayed during the second period T2 after a left and right image in which left-eye and right-eye images are combined has been displayed during the first period T1, a region where the left and right image and the right and left image are mixed is displayed on the display unit 100.

Figure 4:
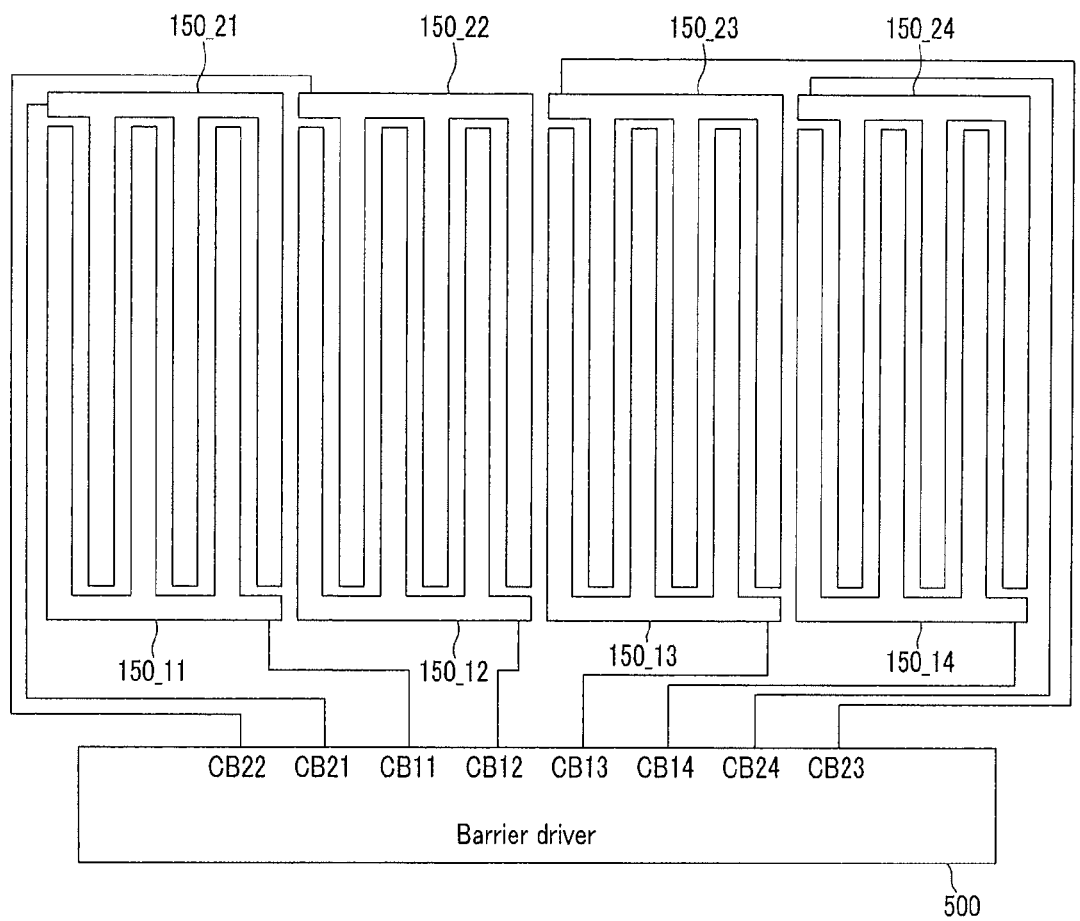
FIG. 4 schematically illustrates a barrier driver and a barrier layer according to an exemplary embodiment of the present invention.

FIG. 4 illustrates the barrier driver 500 and the barrier layer 150 according to an exemplary embodiment of the present invention.

Figure 5:
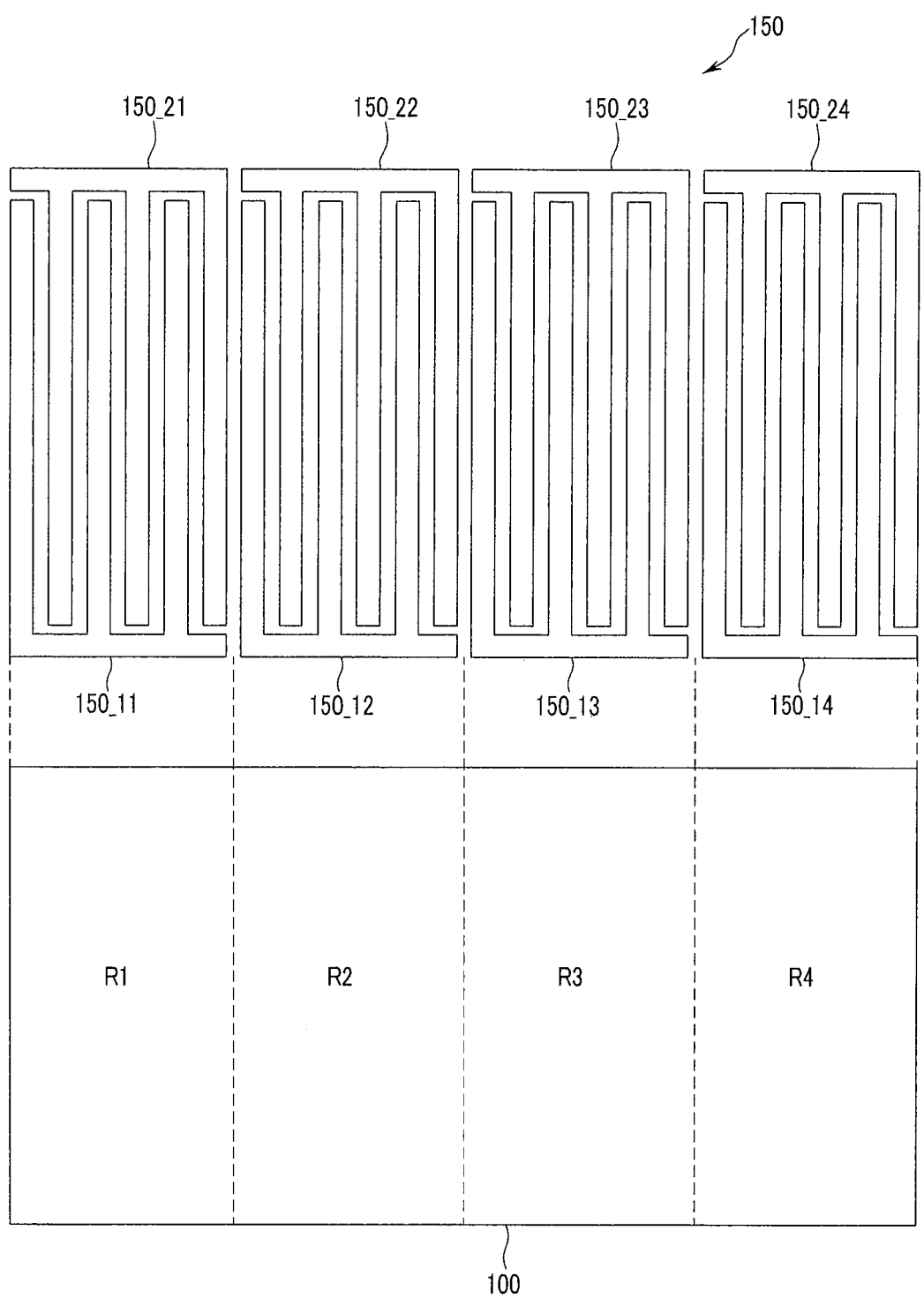
FIG. 5 schematically illustrates a display unit divided into four regions according to an exemplary embodiment of the present invention.

FIG. 5 illustrates the display unit 100 divided into four regions (R1, R2, R3, and R4) in order to explain a corresponding relationship between the display unit 100 and the barrier layer 150 according to the exemplary embodiment of the present invention. In the present exemplary embodiment, the barrier layer 150 is divided into four regions. Also, in each region of the barrier layer 150, one of four first barriers 150_11, 150_12, 150_13, and 150_14 and one of four second barriers 150_21, 150_22, 150_23, and 150_24 make a pair, but the present invention is not limited thereto. In the electronic imaging device according to the exemplary embodiment of the present invention, the barrier layer 150 can be divided into at least two regions and be operated with the at least two regions.

As shown in FIG. 4, the barrier layer 150 includes the plurality of first barriers 150_11, 150_12, 150_13, and 150_14, and the plurality of second barriers 150_21, 150_22, 150_23, and 150_24. The first barrier 150_11 and the second barrier 150_21 are positioned to correspond to the first region R1 of the display unit 100. The first barrier 150_12 and the second barrier 150_22 are positioned to correspond to the second region R2. The first barrier 150_13 and the second barrier 150_23 are positioned to correspond to the third region R3. The first barrier 150_14 and the second barrier 150_24 are positioned to correspond to the fourth region R4. The first and second barriers positioned at the same region are operated according to time division driving. In more detail, when a first image in which the left-eye image and the right-eye image are combined and a second image in which the right-eye image and the left-eye image are combined are alternately displayed during a single frame period in order to display an image of the single frame, if the first image is displayed, the plurality of first barriers 150_11, 150_12, 150_13, and 150_14 are driven, and if the second image is displayed, the plurality of second barriers 150_21, 150_22, 150_23, and 150_24 are driven. Then, the barrier layer 150 is operated during the first period T1 and the second period T2, as described above with reference to FIG. 3. Here, the barrier layer is operated by the pluralities of first and second barriers. Namely, the first and second barriers of the same region are operated in synchronization with a point of time when a select signal is transferred to one of the plurality of scan lines of the display unit corresponding to the region of the first and second barriers. The description therefore will be described in more detail below with reference to FIG. 6.

The barrier driver 500 drives a plurality of barrier drive signals CB11, CB12, CB13, and CB14 (CB11-CB14) and CB21, CB22, CB23, and CB24 (CB21-CB24) at each of the plurality of first barriers 150_11, 150_12, 150_13, and 150_14 and the plurality of second barriers 150_21, 150_22, 150_23, and 150_24 according to a barrier driver control signal. In the exemplary embodiment of the present invention, the barrier drive signals CB11-CB14 and CB21-CB24 have voltages with a level suitable for driving the plurality of first barriers 150_11, 150_12, 150_13, and 150_14 and the plurality of second barriers 150_21, 150_22, 150_23, and 150_24.

The operation will be described in more detail with reference to FIGS. 6 and 7.

Figure 6:
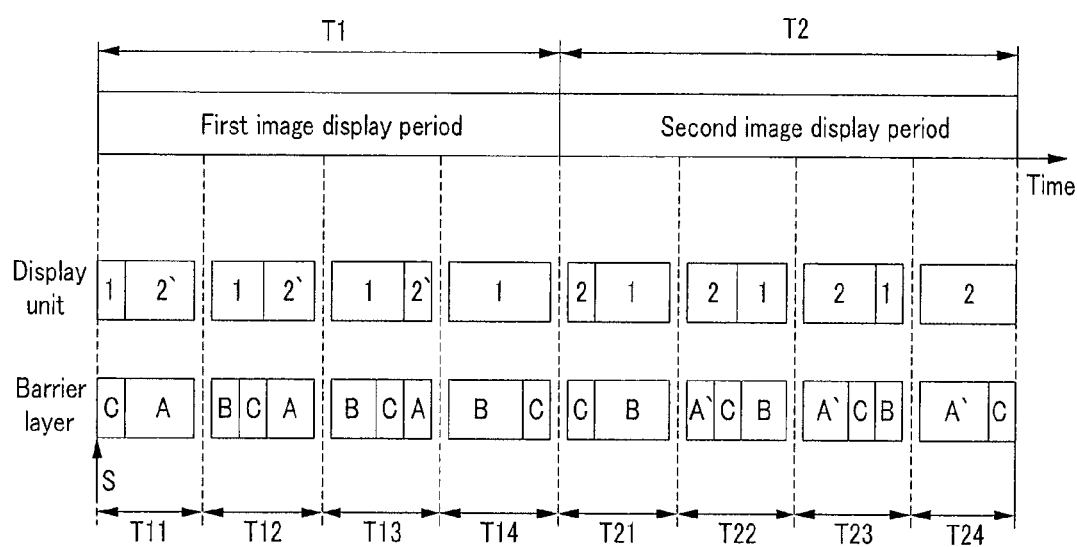
FIG. 6 schematically illustrates a process of displaying a first image during a first period and a second image during a second period on a display unit according to an exemplary embodiment of the present invention.

FIG. 6 illustrates a process of displaying the first image during the first period T1 and the second image during the second period T2 on the display unit 100 according to the exemplary embodiment of the present invention. Namely, FIG. 6 shows the images displayed according to the regions of the display unit 100 and the barrier layer 150, and a state of the barrier layer 150, according to the lapse of time.

Figure 7:
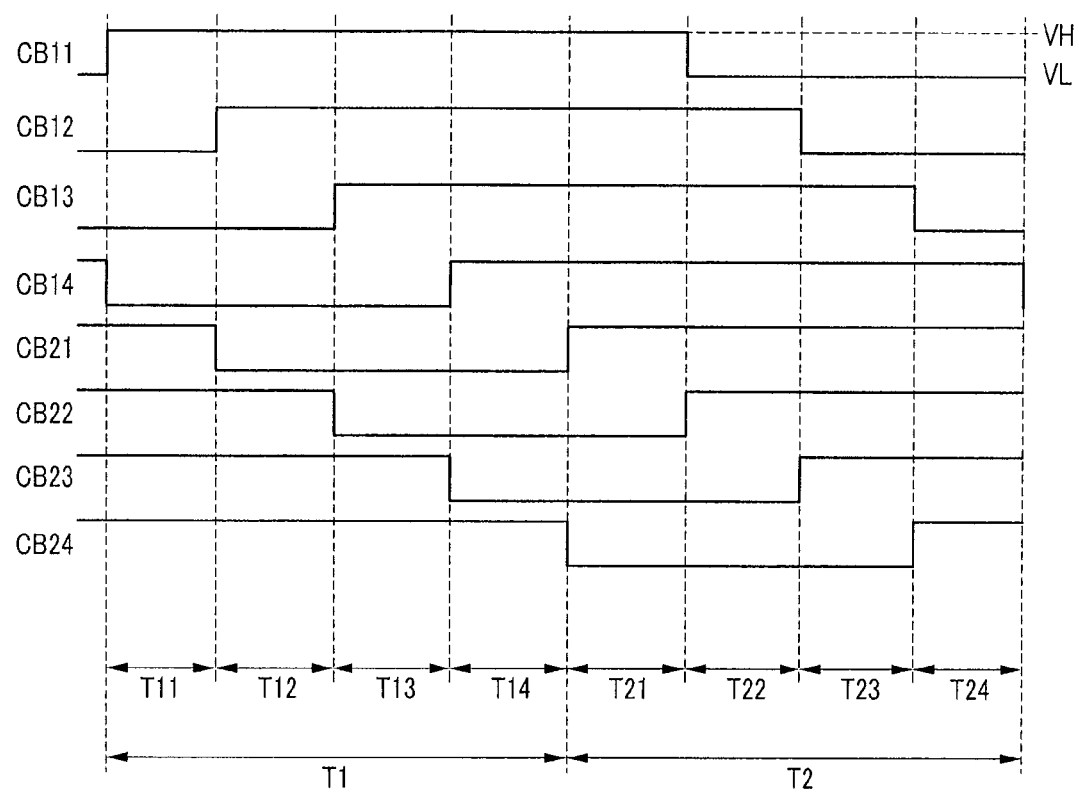
FIG. 7 schematically illustrates barrier drive signals transferred to four first barriers and four second barriers from a barrier driver according to an exemplary embodiment of the present invention.

FIG. 7 illustrates barrier drive signals transferred to the four first barriers 150_11, 150_12, 150_13, and 150_14 and the four second barriers 150_21, 150_22, 150_23, and 150_24 from the barrier driver 500 according to the exemplary embodiment of the present invention. In an embodiment of the present invention, if the barrier layer 150 is normally black, it can become a non-transmission region if a driving voltage is not applied to the four first barriers 150_11, 150_12, 150_13, and 150_14 and to the four second barriers 150_21, 150_22, 150_23, and 150_24. In another embodiment, if the barrier layer is normally white, it can become a non-transmission region if a driving voltage is applied to the four first barriers 150_11, 150_12, 150_13, and 150_14 and to the four second barriers 150_21, 150_22, 150_23, and 150_24. The description herein will be limited to the exemplary case where the four first barriers and the four second barriers are normally white. Accordingly, in the exemplary embodiment of the present invention, the barrier drive signals CB11-CB14 and CB21-CB24 alternately have a barrier driving ON voltage VH and a barrier driving OFF voltage VL.

First, immediately before a point of time (S) at which a first image starts to be displayed, a right and left image 2', in which a right-eye image and a left-eye image are combined, of an immediately previous frame to a current frame is displayed on the entire screen. When a left and right image 1, in which a left-eye image and a right-eye image of the current frame are combined, starts to be output to the display unit, the left and right image 1 starts to be displayed at the plurality of scan lines according to a scan direction of the display unit. Hereinafter, it may be assumed that an overall time during which the right and left image 2' is changed to the left and right image 1 is T1. In the exemplary embodiment of the present invention, as shown in FIGS. 4 and 5, the barrier layer 150 is divided into four regions, each region including a pair of first and second barriers, and accordingly, the display unit 100 is also divided into four regions (R1 to R4 in FIG. 5). The four first barriers and the four second barriers are driven in synchronization with a point of time when one of a plurality of select signals is transferred to the respective regions R1 to R4 of the display unit 100. During the period T1 in FIG. 3, the four first barriers 150_11, 150_12, 150_13, and 150_14 corresponding to the left and right image of the current frame are synchronized to be sequentially driven. During the period T2, the four second barriers 150_21, 150_22, 150_23, and 150_24 corresponding to the right and left image of the current frame are synchronized to be sequentially driven. Here, the first and second barriers of a region in which the right and left image and the left and right image are mixed are driven to become a non-transmission region.

More specifically, first, during a period T11, e.g., a first quarter of the period T1, during which the right and left image 2' starts to be changed to the left and right image 1, the left and right image 1 is displayed on the one-fourth region R1 of the display unit 100 according to the scan direction while the right and left image 2' remains on the three-fourths region R2 to R4. Here, the left and right image 1 and the right and left image 2' coexist on the one-fourth region R1. The mixture (coexistence) of the image of the current frame and that of the immediately previous frame degrades the picture quality. Thus, in order to reduce or prevent this mixture (coexistence), the portion corresponding to a region (C) of the barrier layer 150 is driven as a non-transmission region. Namely, the barrier drive signals CB11 and CB21 have the barrier driving ON voltage VH. Then, the image at the one-fourth region R1 of the display unit 100 can be rejected. The barrier drive signals CB22, CB23, and CB24 have the barrier driving ON voltage VH, and the three second barriers 150_22, 150_23, and 150_24 of the remaining three-fourths region (A) of the barrier layer 150 are driven according to the barrier drive signals CB22, CB23, and CB24, and so the right and left image 2' is displayed as a stereoscopic image on the three-fourths region R2 to R4.

During the next period T12, the left and right image 1 is displayed on the two-fourths region R1 and R2 of the display unit according to the scan direction, while the right and left image 2' remains on the remaining two-fourths region R3 and R4. Here, the left and right image 1 and the right and left image 2' coexist on the region R2. Thus, the portion corresponding to a region (C) of the barrier layer 150 is driven as a non-transmission region. Namely, the barrier drive signals CB12 and CB22 have the barrier driving ON voltage VH. Then, the image of the region R2 of the display unit 100 is rejected. The barrier drive signals CB11, CB23, and CB24 have the barrier driving ON voltage VH, and the two second barriers 150_23 and 150_24 of the region (A) of the barrier layer 150 and the first barrier 150_11 of a region (B) are driven according to the barrier drive signals CB11, CB23, and CB24, and so the left and right image 1 is displayed as a stereoscopic image on the region R1 while the right and left image 2' is displayed as a stereoscopic image on the regions R3 and R4.

During the next period T13, the left and right image 1 is displayed on the three-fourths region R1 to R3 of the display unit according to the scan direction, while the right and left image 2' remains on the remaining one-fourth region R4. Here, the left and right image 1 and the right and left image 2' coexist on the region R3. Thus, the portion corresponding to a region (C) of the barrier layer 150 is driven as a non-transmission region. Namely, the barrier drive signals CB13 and CB23 have the barrier driving ON voltage VH. Then, the image of the region R3 of the display unit 100 is rejected. The barrier drive signals CB11, CB12, and CB24 have the barrier driving ON voltage VH, and the second barrier 150_24 of the region (A) of the barrier layer 150 and the two first barriers 150_11 and 150_12 of the region (B) are driven according to the barrier drive signals CB11, CB12, and CB24, and so the left and right image 1 is displayed as a stereoscopic image on the regions R1 and R2 while the right and left image 2' is displayed as a stereoscopic image on the one-fourth region R4.

During the next period T14, the left and right image 1 is displayed on the entire region R1 to R4 of the display unit 100 according to the scan direction. Here, the left and right image 1 and the right and left image 2' coexist on the region R4. Thus, the portion corresponding to the region (C) of the barrier layer 150 is driven as a non-transmission region. Namely, the barrier drive signals CB14 and CB24 have the barrier driving ON voltage VH. Then, the image of the region R4 of the display unit 100 is rejected. The barrier drive signals CB11, CB12, and CB13 have the barrier driving ON voltage VH, and the three first barriers 150_11, 150_12, and 150_13 of the region (B) of the barrier layer 150 are driven according to the barrier drive signals CB11, CB12, and CB13, and so the left and right image 1 is displayed as a stereoscopic image on the three-fourths region R1 to R3.

The operation during the second period T2 will now be described below in more detail.

First, during a period T21, e.g., a first quarter of the period T2, during which the left-right image 1 starts to be changed to a right and left image 2, the right and left image 2 is displayed on the one-fourth region R1 of the display unit according to a scan direction, while the left and right image 1 remains on the three-fourths region R2 to R4. Here, the left and right image 1 and the right and left image 2 coexist on the one-fourth region R1. The mixture (coexistence) of the left and right image and the right and left image of the current frame degrades the picture quality. Thus, in order to reduce or prevent this mixture (coexistence), the barrier drive signals CB11 and CB21 have the barrier driving ON voltage VH, and the first barrier 150_11 and the second barrier 150_21 are driven according to the barrier drive signals CB11 and CB21, and so the portion corresponding to the region (C) of the barrier layer 150 is formed as a non-transmission region. Then, the image of the region R1 of the display unit is rejected. The barrier drive signals CB12, CB13, and CB14 have the barrier driving ON voltage VH, and the three first barriers 150_12, 150_13, and 150_14 of the region (B) of the barrier layer 150 are driven according to the barrier drive signals CB12, CB13, and CB14, and so the left and right image 1 is displayed as a stereoscopic image on the three-fourths region R2 to R4.

During the next period T22, the right and left image 2 is displayed on the two-fourths region R1 and R2 of the display unit 100 according to the scan direction, while the left and right image 1 remains on the remaining two-fourths region R3 and R4. Here, the left and right image 1 and the right and left image 2 coexist on the region R2. The barrier drive signals CB12 and CB22 have the barrier driving ON voltage VH, and the first barrier 150_12 and the second barrier 150_22 are driven according to the barrier drive signals CB12 and CB22, and so the portion corresponding to the region (C) of the barrier layer 150 is formed as a non-transmission region. Then, the image of the region R2 of the display unit 100 is rejected. Here, the barrier drive signals CB21, CB13, and CB14 have the barrier driving ON voltage VH. The second barrier 150_21 corresponding to a region (A') of the barrier layer 150 is driven according to the barrier drive signal CB21, while the two second barrier 150_13 and 150_14 of the region (B) are driven according to the barrier drive signals CB13 and CB14. Then, the right and left image 2 is displayed as a stereoscopic image on the one-fourth region R1 of the display unit 100, while the left and right image 1 is displayed as a stereoscopic image on the three-fourths region R3 and R4.

During the next period T23, the right and left image 2 is displayed on the three-fourths region R1 to R3 of the display unit 100 according to the scan direction, while the left and right image 1 remains on the remaining one-fourth region R4. Here, the left and right image 1 and the right and left image 2 coexist on the region R3. The barrier drive signals CB13 and CB23 have the barrier driving ON voltage VH, and the first barrier 150_13 and the second barrier 150_23 are driven according to the barrier drive signals CB12 and CB22, and so the portion corresponding to the region (C) of the barrier layer 150 is formed as a non-transmission region. Then, the image of the region R3 of the display unit is rejected. Here, the barrier drive signals CB21, CB22, and CB14 have the barrier driving ON voltage VH. The first barrier 150_14 corresponding to the region (B) of the barrier layer 150 is driven according to the barrier drive signal CB14, and so the left and right image 1 is displayed as a stereoscopic image on the one-fourth region R4. The second barriers 150_21 and 150_22 corresponding to the region (A') of the barrier layer 150 are driven according to the barrier drive signals CB21 and CB22, so the right and left image 2 is displayed as a stereoscopic image on the two-fourths region R1 and R2 of the display unit 100.

During the next period T24, the right and left image 2 is displayed on the entire region R1 to R4 of the display unit 100 according to the scan direction. Here, the left and right image 1 and the right and left image 2 coexist on the region R4. The barrier drive signals CB14 and CB24 have the barrier driving ON voltage VH, and the first barrier 150_14 and the second barrier 150_24 are driven according to the barrier drive signals CB14 and CB24, and so the portion corresponding to the region (C) of the barrier layer 150 is formed as a non-transmission region. Then, the image of the region R4 of the display unit is rejected. Here, the barrier drive signals CB21, CB22, and CB23 have the barrier driving ON voltage, and the three first barriers 150_21, 150_22, and 150_23 of the region (A') of the barrier layer 150 are driven according to the barrier drive signals CB21, CB22, and CB23. Then, the right and left image 2 is displayed as a stereoscopic image on the three-fourths region R1 to R3.

As mentioned above, the non-transmission regions are formed by simultaneously driving the pairs of first and second barriers. Thus, if it is assumed that the barrier drive signals alternately have the barrier driving ON voltage VH and the barrier driving OFF voltage VL, they can be illustrated as shown in FIG. 7.

As shown in FIG. 7, during the period T11, the barrier drive signal CB_11 and the barrier drive signals CB_21, CB22, CB23, and CB24 have the barrier driving ON voltage.

During the period T12, the barrier drive signals CB11 and CB12 and the barrier drive signals CB22, CB23, and CB24 have the barrier driving ON voltage. During the period T13, the barrier drive signals CB11, CB12, and CB13 and the barrier drive signals CB23 and CB24 have the barrier driving ON voltage. During the period T14, the barrier drive signals CB11, CB12, CB13, and CB14 and the barrier drive signals CB24 have the barrier driving ON voltage.

As stated above, the electronic imaging device according to the exemplary embodiment of the present invention displays stereoscopic images according to a time-division driving method, in which the displaying of a region in which the left and right image and the right and left image are mixed can be prevented. In addition, in the electronic imaging device according to the exemplary embodiment of the present invention, the driving frequency and power consumption can be reduced as compared with known devices not driven according to the exemplary embodiment of the present invention.

Figure 8:
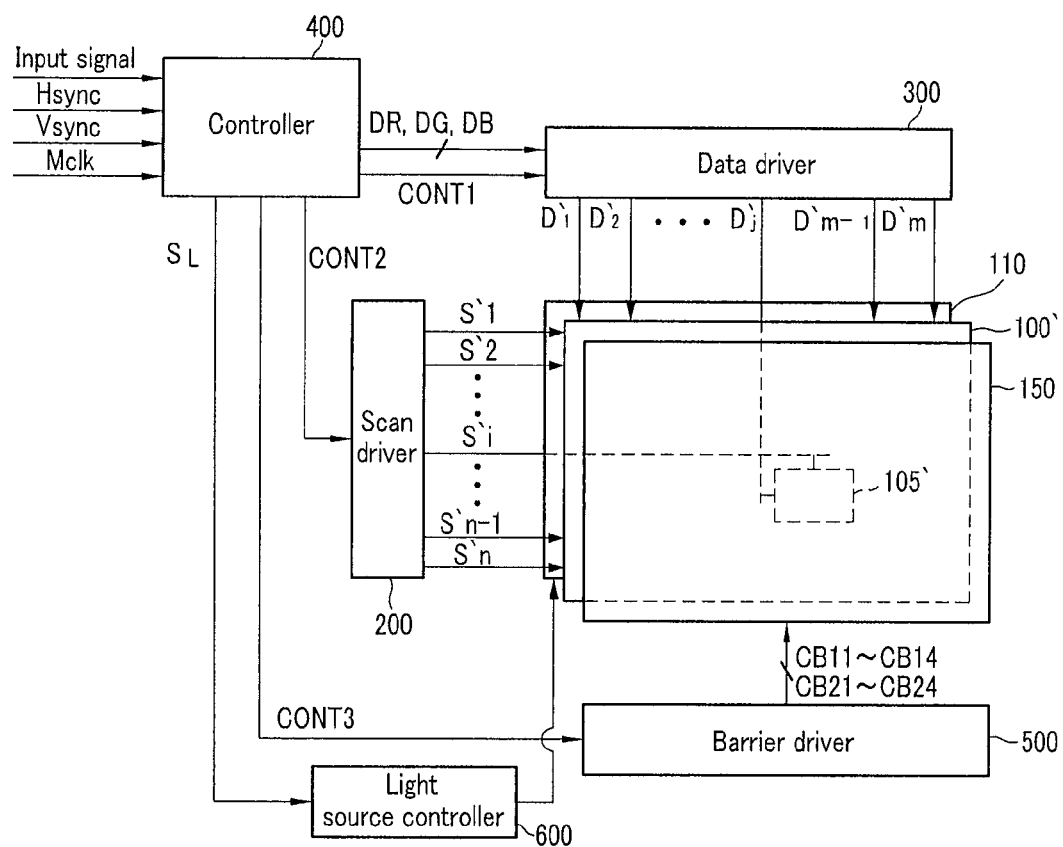
FIG. 8 schematically illustrates an electronic imaging device according to another exemplary embodiment of the present invention.

FIG. 8 schematically illustrates an electronic imaging device according to another exemplary embodiment of the present invention.

As shown in FIG. 8, the electronic imaging device according to another exemplary embodiment of the present invention includes a display unit (or display region) 100' that displays an image by using a liquid crystal layer, a light source 110, and a light source controller 600 in addition to the elements of the former exemplary embodiment of the present invention. The display unit 100' includes a plurality of scan lines S1'~S'n (S1', S2', ..., S'i, ..., S'n−1, S'n) that transfer select signals, a plurality of data lines D'1~D'm (D'1, D'2, ..., D'j, ..., D'm−1, D'm) that transfer data signals and a plurality of pixels 105' that display an image by using the liquid crystal layer. The barrier layer 150 according to the current exemplary embodiment of the present invention is operated in the same manner (or substantially the same manner) as in the previously described exemplary embodiment(s) of the present invention.

Figure 9:
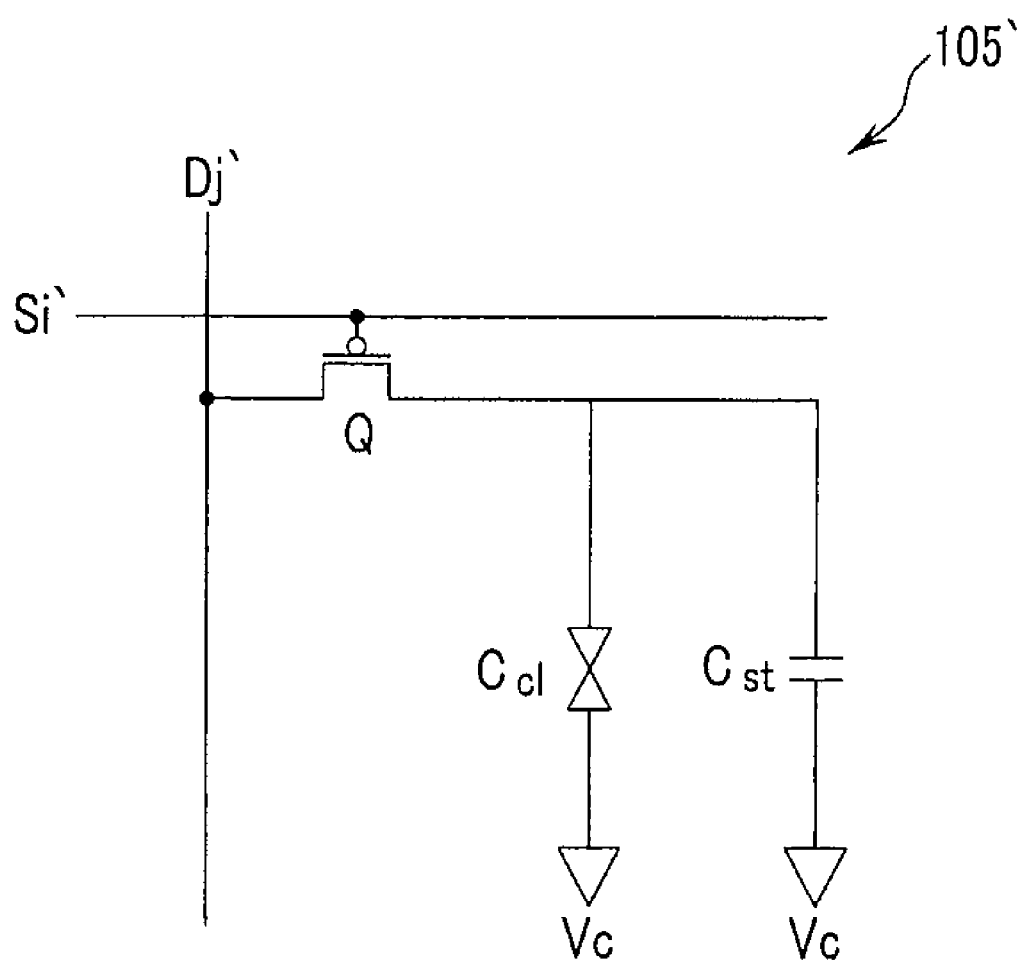
FIG. 9 schematically illustrates the structure of a pixel circuit according to another exemplary embodiment of the present invention.

FIG. 9 schematically illustrates the structure of a pixel circuit according to another exemplary embodiment of the present invention.

As shown in FIG. 9, a pixel circuit of a pixel 105' includes a switching element Q, a liquid crystal layer Ccl, and a storage capacitor Cst. The switching element Q is turned on in response to a select signal transferred by a scan line Si'. In the current exemplary embodiment of the present invention, as the switching element Q, a p-type transistor is used. When the switching element Q is turned on by a select signal with a sufficiently (or suitably) low level, a data signal of the data line Dj' is transferred through the turned-on switching element Q and the liquid crystal layer is driven according to a voltage difference between the voltage of the data signal and a common voltage Vc to refract light transferred from the light source 110. Here, the storage capacitor Cst maintains a uniform voltage difference between both ends of the liquid crystal layer Ccl.

In one embodiment, the light source 110 includes red (R), green (G), and blue (B) light emitting diodes (LEDs), and outputs light rays corresponding to red (R), green (G), and blue (B) colors to the display unit 100'. In more detail, the red (R), green (G), and blue LEDs of the light source 110 output lights to R, G, and B sub-pixels of the display unit 100', respectively.

The light source controller 600 controls a lighting time of the LEDs of the light source 110 in response to a control signal SL. Here, a period during which an analog data voltage is supplied from the data driver 300 to data lines and a period during which the R, G, and B LEDs are turned on by the light source controller 600 can be synchronized by a control signal provided by the controller 400.

The electronic imaging device including the liquid crystal layer and its driving method according to the current exemplary embodiment of the present invention can reduce the driving frequency and power consumption in the time division driving, compared with known devices.

The exemplary embodiments of the present invention can provide an electronic imaging device and a driving method therefor that can display a stereoscopic image according to a time division driving method and reduce the driving frequency.

Therefore, the electronic imaging device and the driving method can reduce power consumption.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electronic imaging device comprising:
 a display unit comprising a plurality of scan lines for transferring a plurality of select signals, a plurality of data lines for transferring a plurality of data signals corresponding to first and second images formed according to at least one input signal, and a plurality of pixels connected with the scan lines and the data lines; and
 a barrier layer comprising at least two first barriers and at least two second barriers corresponding to the at least two first barriers,
 wherein the first image is displayed in a first region of the display unit during a first period of a unit period during which an image of a single frame is displayed, wherein the second image is displayed in the first region of the display unit during a second period different from the first period, wherein the at least two first barriers are driven according to the first image, wherein the at least two second barriers are driven according to the second image, and wherein a first barrier of the at least two first barriers and a second barrier of the at least two second barriers are driven to block light in the first region of the display unit during a third period different from the first period and the second period, the third period being a period in which the first and second images coexist in the first region.

2. The device of claim 1, wherein the first barriers are driven in synchronization with when one of the select signals is transferred to one of a plurality of first scan lines of the plurality of scan lines, the first scan lines corresponding to the at least two first barriers.

3. The device of claim 2, wherein the at least two first barriers comprise:
 a plurality of first electrodes corresponding to each of the plurality of first scan lines; and
 a first connection electrode connected to the plurality of first electrodes.

4. The device of claim 1, wherein the at least two second barriers are driven in synchronization with when one of the select signals is transferred to one of a plurality of first scan lines of the plurality of scan lines, the first scan lines corresponding to the at least two second barriers.

5. The device of claim 4, wherein the at least two second barriers comprise:
 a plurality of first electrodes corresponding to each of the plurality of first scan lines; and
 a first connection electrode connected to the plurality of first scan lines.

6. The device of claim 1, wherein the at least two first barriers are driven in synchronization with when one of the select signals is transferred to one of a plurality of first scan lines of the plurality of scan lines during the first period, the first scan lines corresponding to the at least two first barriers, and wherein the at least two second barriers corresponding to the at least two first barriers are driven in synchronization with when the one of the select signals is transferred to the one of the plurality of first scan lines during the second period.

7. The device of claim 6, wherein the at least two first barriers comprise:
 a plurality of first electrodes corresponding to each of the plurality of first scan lines; and
 a first connection electrode connected to the plurality of first electrodes, and
 wherein the at least two second barriers comprise:
 a plurality of second electrodes corresponding to each of the plurality of first scan lines and positioned parallel to each of the plurality of first electrodes.

8. The device of claim 1, wherein after the second image has been displayed, when a third image of another frame following the single frame is displayed, the at least two first barriers are driven according to the third image.

9. The device of claim 1, wherein the at least one input signal comprises a first time point image corresponding to a first time point and a second time point image corresponding to a second time point, and wherein the first image is generated by combining the first and second time point images in the order of the first time point and the second time point, while the second image is generated by combining the first and second time point images in the order of the second time point and the first time point.

10. The device of claim 9, wherein the first image is displayed according to a scan direction in which one of the select signals is transferred to the plurality of scan lines during the first period, wherein the second image is displayed according to the scan direction during the second period, and wherein, during the third period, the first region is a region in which the first and second images coexist as the second image starts to be displayed according to the scan direction after the first image has been displayed.

11. The device of claim 1, wherein each of the pixels comprises an organic light emitting element.

12. The device of claim 1, wherein each of the pixels comprises a liquid crystal layer.

13. An electronic imaging device comprising:
- a display unit comprising:
  - a plurality of scan lines configured to transfer a plurality of select signals;
  - a plurality of data lines configured to transfer a plurality of data signals corresponding to first and second images formed according to at least one input signal; and
  - a plurality of pixels coupled with the scan lines and the data lines; and
- a barrier layer comprising at least three first barriers and at least three second barriers corresponding to the at least three first barriers;
- wherein the barrier layer is configured to drive the at least three first barriers and the at least three second barriers during a first period to concurrently display a portion of the first image in a first region of the display unit and a portion of the second image in a second region of the display unit,
- wherein the barrier layer is further configured to drive the at least three first barriers and the at least three second barriers during the first period to form a non-transmissive region in a region of the barrier layer corresponding to a third region of the display unit in which the first and second images coexist, and
- wherein the barrier layer is further configured to drive the at least three first barriers and the at least three second barriers during a second period differing from the first period to display another portion of the first image in the third region of the display unit or another portion of the second image in the third region of the display unit.

* * * * *